United States Patent
Galvano et al.

(10) Patent No.: US 10,070,489 B1
(45) Date of Patent: Sep. 4, 2018

(54) DRIVER CIRCUIT FOR AUTOMATIC DETECTION AND SYNCHRONIZATION OF DYNAMIC LOADS

(71) Applicant: Infineon Technologies AG, Neubiberg (DE)

(72) Inventors: Maurizio Galvano, Padua (IT); Adolfo De Cicco, Castel d'Azzano (IT); Roberto Penzo, Vigonza (IT); Enrico Tonazzo, Villanova di Camposampiero (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/446,530

(22) Filed: Mar. 1, 2017

(51) Int. Cl.
| | |
|---|---|
| *H05B 33/08* | (2006.01) |
| *B60Q 1/14* | (2006.01) |
| *B60Q 1/34* | (2006.01) |

(52) U.S. Cl.
CPC ......... *H05B 33/083* (2013.01); *B60Q 1/1423* (2013.01); *B60Q 1/34* (2013.01); *H05B 33/0812* (2013.01); *H05B 33/0815* (2013.01); *H05B 33/0851* (2013.01)

(58) Field of Classification Search
CPC .............. H05B 33/083; H05B 33/0812; H05B 33/0815; H05B 33/0851; H05B 37/036; B60Q 1/34
See application file for complete search history.

(56) References Cited

U.S. PATENT DOCUMENTS

| | | | | |
|---|---|---|---|---|
| 6,370,051 B1* | 4/2002 | Patel | ................. | H02M 3/33538 363/132 |
| 6,864,641 B2* | 3/2005 | Dygert | ............... | H05B 33/0815 315/194 |
| 7,911,193 B2* | 3/2011 | Galvano | ............. | H02M 3/3376 323/284 |
| 8,283,870 B2* | 10/2012 | Ger | .................... | H05B 33/0824 315/125 |
| 8,773,038 B2* | 7/2014 | Logiudice | ............ | H05B 33/083 315/291 |
| 8,791,645 B2* | 7/2014 | Saccomanno | ........ | G09G 3/3406 315/159 |
| 2012/0274290 A1* | 11/2012 | Ye | ......................... | H02M 3/156 323/234 |

(Continued)

*Primary Examiner* — Tung X Le
*Assistant Examiner* — Raymond R Chai
(74) *Attorney, Agent, or Firm* — Shumaker & Sieffert, P.A.

(57) ABSTRACT

An example method for preventing overcurrent in light-emitting diode (LED) chains comprises deactivating a current regulation control loop connected to a plurality of LED chains; regulating, via a voltage regulation control loop, a forward voltage of the plurality of LED chains; upon determining that a forward voltage of the plurality of LED chains is equal to a target operating voltage for a subset of the plurality of LED chains, bypassing at least one of the plurality of LED chains such that only the subset of the plurality of LED chains is connected to the current regulation control loop; and upon determining that an output current of the subset of the plurality of LED chains is equal to a target operating current for the subset of the plurality of LED chains: deactivating the voltage regulation control loop; and activating the current regulation control loop.

20 Claims, 7 Drawing Sheets

(56) References Cited

U.S. PATENT DOCUMENTS

| | | | |
|---|---|---|---|
| 2013/0320850 A1* | 12/2013 | Nakamura | F21S 48/1747 315/82 |
| 2015/0102723 A1* | 4/2015 | Krick | B60Q 3/00 315/77 |
| 2015/0256071 A1* | 9/2015 | Penzo | H02M 3/1582 315/297 |
| 2015/0351193 A1* | 12/2015 | Chao | H05B 33/0887 315/122 |
| 2016/0183337 A1 | 6/2016 | Galvano et al. | |
| 2017/0055327 A1* | 2/2017 | Kang | H05B 33/0896 |

\* cited by examiner

DRIVER CIRCUIT FOR AUTOMATIC DETECTION AND SYNCHRONIZATION OF DYNAMIC LOADS

TECHNICAL FIELD

This disclosure generally relates to driver circuits for light-emitting diode (LED) applications.

BACKGROUND

Some applications in automotive lighting or other applications involve a plurality of LED chains, each including a number of LEDs connected in series. The number may vary depending on the specific application. One or more of the LEDs can be bypassed at times, temporarily reducing the length of the LED chain. A DC/DC converter may control the current flowing through the LED chain as different numbers of the LEDs in the chain are used, while the output voltage is set by the number and the forward voltage of the LEDs that compose the chain.

SUMMARY

In general, the disclosure describes techniques, methods, devices, and systems for preventing overcurrent in one or more LED chains connected in series when bypassing at least one LED chain of the one or more LED chains connected in series. A driver circuit for one or more LED chains comprises a closed loop current regulator, such as a DC-DC current regulator or a linear current regulator, that functions to control the intensity of the LED chain by adjusting the amount of current flowing through the LED chain. The driver circuit for one or more LED chains further comprises a voltage regulation control loop which is activated in response to an external command to reach and maintain the desired voltage value and a sample & hold circuit to store the load current value when reaching the new target output voltage. When one or more LED chains are going to be bypassed, the driver circuit deactivates the current regulator and activates the voltage regulation control loop. When the target output voltage is reached, the one or more LED chains may be bypassed. Upon detecting that the output current has risen to an expected output current for the remaining one or more LED chains, the driver circuit deactivates the voltage regulation control loop and re-activates the current regulation control loop.

In one example, this disclosure describes a method including: deactivating a current regulation control loop, wherein the current regulation control loop is connected to a plurality of light-emitting diode (LED) chains in series; regulating, via a voltage regulation control loop connected to the plurality of LED chains, a forward voltage of the plurality of LED chains; upon determining that a forward voltage of the plurality of LED chains is equal to a target operating voltage for a subset of the plurality of LED chains, bypassing at least one of the plurality of LED chains such that only the subset of the plurality of LED chains is connected to the current regulation control loop and the voltage regulation control loop; and upon determining that an output current of the subset of the plurality of LED chains is equal to a target operating current for the subset of the plurality of LED chains: deactivating the voltage regulation control loop; and activating the current regulation control loop.

In another example, this disclosure describes a driver circuit for a plurality of light-emitting diode (LED) chains, configured to: deactivate a current regulation control loop, wherein the current regulation control loop is connected to a plurality of light-emitting diode (LED) chains; regulate, via a voltage regulation control loop connected to the plurality of LED chains, a forward voltage of the plurality of LED chains; upon determining that a forward voltage of the plurality of LED chains is equal to a target operating voltage for a subset of the plurality of LED chains, bypass at least one of the plurality of LED chains such that only the subset of the plurality of LED chains is connected to the current regulation control loop and the voltage regulation control loop; and upon determining that an output current of the subset of the plurality of LED chains is equal to a target operating current for the subset of the plurality of LED chains: deactivate the voltage regulation control loop; and activate the current regulation control loop.

In another example, this disclosure describes a system including: a driver circuit, configured to: deactivate a current regulation control loop, wherein the current regulation control loop is connected to a plurality of light-emitting diode (LED) chains; regulate, via a voltage regulation control loop connected to the plurality of LED chains, a forward voltage of the plurality of LED chains; upon determining that a forward voltage of the plurality of LED chains is equal to a target operating voltage for a subset of the plurality of LED chains, bypass at least one of the plurality of LED chains such that only the subset of the plurality of LED chains is connected to the current regulation control loop and the voltage regulation control loop; and upon determining that an output current of the subset of the plurality of LED chains is equal to a target operating current for the subset of the plurality of LED chains: deactivate the voltage regulation control loop; and activate the current regulation control loop; and the plurality of LED chains.

The details of one or more examples of the techniques of this disclosure are set forth in the accompanying drawings and the description below. Other features, objects, and advantages of the techniques will be apparent from the description and drawings, and from the claims.

DETAILED DESCRIPTION

A driver circuit for one or more LED chains comprises a closed loop current regulator, such as a DC-DC current regulator or a linear current regulator, that functions to control the intensity of the LED chain by adjusting the amount of current flowing through the LED chain. In some examples, the current regulator is implemented via a current regulation control loop and a power source. In other systems, such a driver circuit includes a plurality of LED chains connected in series. Further, the driver circuit comprises a plurality of bypass switches, wherein the driver circuit may selectively activate each bypass switch to bypass a corresponding one of the plurality of LED chains. Upon activating one of the plurality of bypass switches to bypass a corresponding LED chain, the driver circuit discharges the output tank capacitor of the current regulator through the remaining LED chains. The current flowing through the remaining LED chains is limited only by the series resistances of the LEDs of the remaining LED chains themselves. In some situations, the series resistance is insufficient to prevent overcurrent, which may damage or reduce the operating life of the LEDs of the remaining LED chains.

In other systems, to prevent overcurrent, prior to bypassing the one or more LED chains, the driver circuit deactivates the current regulator so as to stop the energy transfer to the plurality of LED chains. The driver circuit allows the LED chains to discharge the output capacitor to a desired voltage value, wherein the desired voltage value is a target operating voltage for the one or more remaining LED chains after bypassing the one or more bypassed LED chains. However, this requires a microcontroller of the driver circuit to continuously poll the output capacitor to determine when the output capacitor reaches the desired voltage value. Further, to prevent overcurrent, the driver circuit must synchronize reactivating the current regulator and activating a bypass switch to bypass the one or more LED chains. If the reactivation of the current regulator does not occur simultaneously with activating the bypass switch, the extra voltage induced by the current regulator may cause an overcurrent through the one or more LED chains, potentially causing damage to or decreasing the operating life of the one or more LED chains.

According to the techniques of the disclosure, a driver circuit for one or more LED chains further comprises a voltage regulation control loop which is activated in response to an external command to reach and maintain the desired voltage value and a changed load detector to detect output current changes in the one or more LED chains. Prior to bypassing the one or more LED chains, the driver circuit of the present disclosure deactivates a current regulation control loop and activates the voltage regulation control loop to discharge the output capacitor to a desired voltage value. The changed load detector triggers when the output capacitor reaches a desired voltage value, which indicates that voltage value is such that one or more LED chains may be bypassed. The driver circuit activates a bypass switch to bypass the one or more LED chains. Upon detecting, via the changed load detector, that the output current has risen to an expected value with respect to the stored value for the remaining one or more LED chains, the driver circuit deactivates the voltage regulation control loop and re-activates a current regulation control loop.

Figure 1:
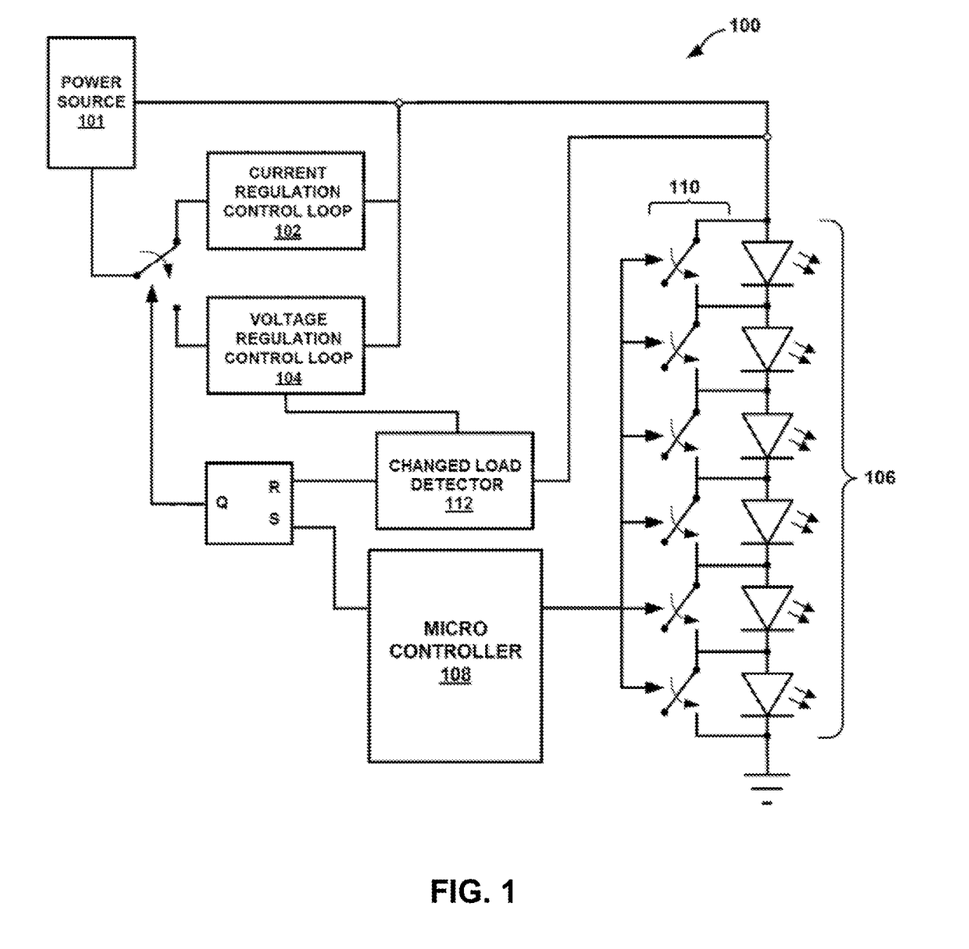
FIG. 1 is a block diagram illustrating an example driver circuit for a plurality of LED chains in accordance with the techniques of the disclosure.

FIG. 1 is a block diagram illustrating an example driver circuit 100 for a plurality of LED chains 106 in accordance with the techniques of the disclosure. Driver circuit 100 includes a power source 101, that functions to deliver power to plurality of LED chains 106. The driver circuit 100 further includes a current regulation control loop 102 that, when connected to power source 101 and plurality of LED chains 106, functions as a DC-DC current regulator or a linear current regulator, to control the intensity of the plurality of LED chains 106 by regulating the amount of current flowing through the plurality of LED chains 106. Driver circuit 100 further includes a voltage regulation control loop 104 that, when connected to power source 101 and plurality of LED chains 106, functions to maintain a constant forward voltage across the plurality of LED chains 106. Driver circuit 100 further includes a microcontroller 108 for controlling the various circuitry of driver circuit 100.

Driver circuit 100 additionally includes a plurality of bypass switches 110. Microcontroller 108 of driver circuit 100 may selectively activate each bypass switch 110 to bypass a corresponding one of the plurality of LED chains 106. In one implementation, microcontroller 108 activates each bypass switch of plurality of bypass switches 110 according to a unique duty cycle. In this way, microcontroller 108 may selectively apply digital modulation, such as pulse-width modulation (PWM), pulse-duration modulation, or pulse-density modulation, for separate dimming of each LED chain of plurality of LED chains 106.

In some examples, plurality of bypass switches 110 are a single multi-floating switch. In this example, each switch of the multi-floating switch is independently selectable, and is controlled by microcontroller 108. In other examples, plurality of bypass switches 110 are a plurality of transistors, such as metal-oxide-semiconductor field-effect transistors (MOSFETs) or bipolar junction transistors (BJTs). In some examples, plurality of bypass switches 110 are power MOSFETs. In some examples, plurality of bypass switches 110 are vertical bi-polar junction transistors (BJTs). In other examples, plurality of bypass switches 110 are vertical metal-oxide-semiconductor field effect transistors (MOSFETs). In some examples, plurality of bypass switches 110 are source-down or source-up transistors. In some examples, plurality of bypass switches 110 are lateral MOSFETs. In some examples, plurality of bypass switches 110 are lateral n-type channel MOSFETs built on a p-type substrate. In some examples, plurality of bypass switches 110 are lateral n-type channel MOSETs built on Silicon-on-Insulator (SOI) substrate. In some examples, plurality of bypass switches 110 are a cascode of an n-type channel junction-gate field effect transistor (JFET) in series with a low-voltage MOSFET. In some examples, plurality of bypass switches 110 are superjunction MOSFETs. In some examples, plurality of bypass switches 110 have high switching speed and low gate charge. In some examples, plurality of bypass switches 110 have low capacitance from drain to source and from drain to substrate.

When driver circuit 100 activates one of the plurality of bypass switches 110 to bypass a corresponding LED chain 106, the output tank capacitor of the current regulation control loop 102 (not depicted) is discharged through the remaining LED chains 106. Without using the techniques of the disclosure, the current flowing through the remaining LED chains 106 is limited only by the series resistances of the LEDs of the remaining LED chains 106 themselves. The series resistance of the remaining LED chains 106 may be insufficient to prevent overcurrent, which may damage or reduce the operating life of the LEDs of the remaining LED chains.

In some examples, Microcontroller 108 is one or more microprocessors, digital signal processors (DSPs), application specific integrated circuits (ASICs), field programmable gate arrays (FPGAs), or any other equivalent integrated or discrete logic circuitry, as well as any combinations of such components. Microcontroller 108 may include memory, which may be random access memory (RAM), read only memory (ROM), programmable read only memory (PROM), erasable programmable read only memory (EPROM), electronically erasable programmable read only memory (EEPROM), flash memory, comprising executable instructions for causing the one or more processors to perform the actions attributed to them. In some examples, this memory is on-board microcontroller 108, while in other examples, this memory is externally coupled to microcontroller 108. Further, this memory may be implanted entirely in hardware, software, or a combination thereof.

The LEDs of the plurality of LED chains 106 may be any sort of LED, such as organic LEDs (OLEDs), phosphor-based LEDs, Quantum Dot LEDs (QD-LEDs), miniature LEDs, low-current LEDs, ultra-high output LEDs, high-power LEDs, multi-color LEDs, or filament LEDs. In some examples, LED 106 is a single LED. In other examples, LEDs 106 are a string of LEDs, a group of strings of LEDs, or an array of LEDs.

Power source 101 delivers operating power to various components of driver circuit 100. Power source 101 includes all of the power circuitry to implement a linear or DC-DC regulator for supplying power to the elements of driver circuit 100. In one example, power source 101 further includes a rechargeable or non-rechargeable battery, such as an Alkaline, Zinc-Carbon, Lead-Acid, Mercury, Lithium Ion, Lithium Polymer, Silver Oxide, Nickel-Cadmium, Nickel-Metal Hydride, or Nickel-Zinc battery. In some examples, the battery is a vehicle battery and is recharged by an alternator of the vehicle. In other examples, power source 101 includes circuitry for converting an alternating current (AC) power source from a local utility into direct-current (DC) power for use by driver circuit 100. In further examples, power source 101 includes a power generation circuit to produce the operating power.

Current regulation control loop 102 is a closed-loop power control circuit that operates to ensure that the current flowing into plurality of LED chains 106 remains constant. In some examples, when connected to power source 101, current regulation control loop 102 functions as a DC-DC current regulator or a linear current regulator. In some examples, current regulation control loop 102 uses a pulse-width modulation signal to generate an output current. Current regulation control loop 102 further includes a feedback signal for regulating the output current. Current regulation control loop 102 may have a faster response time than voltage regulation control loop 104. Current regulation control loop 102 may further eliminate loop-gain variation with input voltage that occurs with some voltage regulation control loops.

In other systems, driver circuit 100 must synchronize reactivating current regulation control loop 102 and activating one of bypass switches 110 to bypass one or more LED chains of the plurality of LED chains 106. If the reactivation of current regulation control loop 102 does not occur simultaneously with activating the corresponding bypass switch 110, the extra voltage induced by current regulation control loop 102 may cause an overcurrent through one or more of the remaining LED chains 106, potentially causing damage to or decreasing the operating life of the remaining LED chains 106.

According to the techniques of the disclosure, driver circuit 100 further comprises a voltage regulation control loop 104. Voltage regulation control loop 104 is a closed-loop power control circuit that operates to ensure that the forward voltage across plurality of LED chains 106 remains constant. Typically, voltage regulation control loop 104 uses a pulse-width modulation (PWM) signal to generate the output voltage. In some examples, the voltage regulation control loop 104 generates the PWM signal by applying a control voltage to a first input of a comparator and a saw tooth voltage signal having a fixed frequency to the second input of the comparator. Thus, the duty cycle of the PWM signal is proportional to the control voltage and determines the percentage of the time that the switching element conducts, and in turn, the value of the output voltage. As compared to current regulation control loop 102, voltage regulation control loop 104 may have a slower response time. However, in contrast to current regulation control loop 102, voltage regulation control loop 104 operates to maintain a constant voltage across plurality of LED chains 106. In ordinary operation, driver circuit 100 drives the plurality of LED chains 106 via current regulation control loop 102, while when selectively enabling or disabling one or more of plurality of LED chains 106, driver circuit 100 uses voltage regulation control loop 104 such that voltage regulation control loop 104 to regulate a constant voltage across the plurality of LED chains 106 before the number of active LEDs of plurality of LED chains 106 changes. Therefore, driver circuit 100 may more closely synchronize the delivery of power to plurality of LED chains 106 while dynamically enabling and disabling one or more of LED chains 106. In contrast to other systems that do not implement the techniques of the disclosure, such a driver circuit 100 may avoid inducing overcurrent plurality of LED chains 106, and prevent damage to or decreasing the operating life of plurality of LED chains 106.

Further examples of current regulation control loop 102 and voltage regulation control loop 104 may be found in U.S. Patent App. Pub. 2016/0183337 to Galvano, et. al, entitled "ADAPTIVE DIRECT CURRENT (DC) TO DC (DC-TO-DC) LIGHT EMITTING DIODE (LED) DRIVER FOR DYNAMIC LOADS" and published on Jun. 23, 2016, the content of which is incorporated herein in its entirety.

Driver circuit 100 may further include a changed load detector 112. Changed load detector circuit 112 operates to detect when the output current has risen in response to a deactivation of one or more LED chains of plurality of LED chains 106, operated via the plurality of bypass switches 110. Changed load detector 112 operates to store an output current value and compare it with the real-time output current value. The output signal of the changed load detector circuit 112 can be used to deactivate voltage regulation control loop 104 and reactivate current regulation control loop 102.

In some examples, changed load detector 112 includes a Sample&Hold (S&H) circuit, which operates to store a target current for a remaining plurality of LED chains 106 and acts as a reference value to allow subsequent deactivating voltage regulation control loop 104 and reactivating current regulation control loop 102. In some examples, the S&H circuit functions as an Analog-to-Digital Converter (ADC) to convert an analog output current flowing from plurality of LED chains 106 into a discrete digital signal. In some examples, the S&H circuit is implemented simply via a switch and a capacitor. In other examples, the S&H circuit is implemented using a flip-flop. In still further examples, the S&H circuit is implemented using one or more discrete logic gates and circuits.

In an example operation to bypass one or more LED chains of plurality of LED chains 106, microcontroller 108 deactivates current regulation control loop 102 and activates voltage regulation control loop 104. Upon doing so, the voltage across plurality of LED chains 106 falls to a target operating voltage for the remaining plurality of LED chains 106. Upon the voltage across plurality of LED chains 106 reaches the target voltage changed load detector 112 stores the value of the current flowing through plurality of LED chains 106. Driver circuit 100 bypasses, via the plurality of bypass switches 110, one or more of the plurality of LED chains 106 such that only the remaining plurality of LED chains 106 receive power. The output current flowing through the remaining plurality of LED chains 106 rises, and upon detecting, via the changed load detector 112, that the output current has risen to an expected value with respect to the stored value (e.g., the target output current for the remaining plurality of LED chains 106), driver circuit 100 deactivates voltage regulation control loop 104 and reactivates current regulation control loop 102.

In some examples, driver circuit 100 includes a comparator (not depicted) for comparing the signal received from changed load detector 112, which retains a target output current for the remaining LED chains of the plurality of LED chains 106, to a current flowing through the remaining LED chains. Microcontroller 108 may use the output of the comparator to determine when to deactivate voltage regulation control loop 104 and reactivate current regulation control loop 102. In the example of FIG. 1, the functions of the comparator are performed by microcontroller 108. In further examples, the functions of changed load detector 112 are performed by microcontroller 108.

Such a driver circuit as described may be useful for controlling a plurality of LED chains in a vehicle headlight illumination system. As example, plurality of LED chains 106 are connected in series, wherein each LED chain of the plurality of LED chains 106 provides a particular function for the vehicle illumination system. For example, a first LED chain provides high-beam functionality, a second LED chain provides low-beam functionality, a third LED chain provides corner light functionality, a fourth LED chain provides daytime running light (DRL) functionality, and a fifth LED chain provides positioning light functionality. Other types of vehicles may have different types of configurations as well.

The driver circuit described herein may be suitable for any type of vehicle headlight illumination system, for example, such as those used in automobiles, such as cars, trucks, and sport utility vehicles (SUV), watercraft and ships, aircraft, military vehicles, such as tanks, jeeps, and half-tracks, amphibious vehicles, transportation vehicles, such as semi-trucks and trailers, construction vehicles, such as bulldozers, tractors, backhoes, and cranes, heavy machinery, trains, motorcycles, mopeds, recreational vehicles such as golf carts, dune buggies, and all-terrain vehicles (ATV), unpowered vehicles, such as bicycles, and many other types of vehicles not explicitly described herein.

Figure 2:
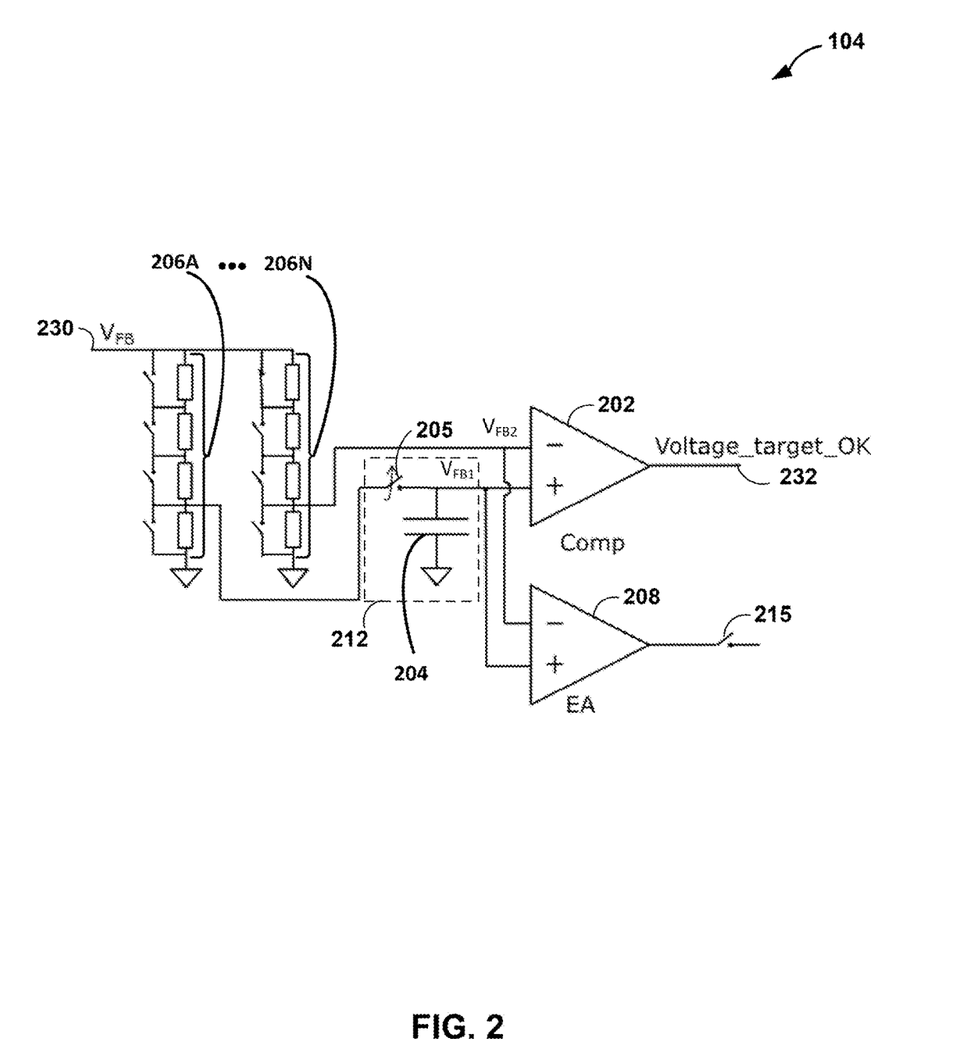
FIG. 2 is a block diagram illustrating an example control loop for the driver circuit of FIG. 1, in accordance with the techniques of the disclosure.

FIG. 2 is a block diagram illustrating an example control loop 104 for the driver circuit 100 of FIG. 1, in accordance with the techniques of the disclosure. Control loop 104 of FIG. 2 is an example of the voltage regulation control loop 104 of FIG. 1.

As shown, voltage control regulation loop 104 includes an input port 230, voltage dividers 206A-206N, a switch 205, a comparator 202, an error amplifier 208, a switch 215, and an output port 232.

Comparator 202 is a circuit that receives two inputs and outputs a comparison of the two inputs. In some examples, comparator 202 outputs a signal indicating which of the two inputs is larger. In other examples, comparator 202 outputs a signal indicating the magnitude of the difference.

Error amplifier 208 generates an error control signal indicating a difference between a feedback signal and a target reference. In some examples, error amplifier 208 is an operational amplifier.

S&H circuit 212 may be implemented using a switch 205 and a capacitor 204. Capacitor 204 is any device that includes at least two electrical conductors or plates that are separated by a dielectric material such that the dielectric material stores energy when polarized by an electrical field. In some examples, capacitor 204 is a ceramic capacitor, a film or power film capacitor, an electrolytic capacitor, an integrated capacitor, a power capacitor, or a variable capacitor. In some examples, the dielectric of the capacitor comprises glass, ceramic, plastic film, air, vacuum, paper, mica, or oxide layers.

The voltage control regulation loop 104 is adapted to regulate power supply 101 from an initial output voltage to a target output voltage by manipulating resistances of the voltage dividers 206A-206N in accordance with a ratio between an initial load (e.g., the number of circuit elements in the chain prior to changing the chain's length) and a final load (e.g., the number of circuit elements in the chain after changing the chain's length). The number of resistors in the voltage dividers 206A-206N may be equal to the max number of LEDs of plurality of LED chains 106 that can be connected to the output. The voltage divider 206A represents the load during the first period (e.g., a first number of LED chains 106A of plurality of LED chains 106), and the voltage divider 206N represents the target load at the beginning of the second period (e.g., a second number of LED chains 106B of plurality of LED chains 106). For example, if the load is being decreased from four LEDs to three LEDs, then the voltage divider 206A connects four series-connected resistors and the voltage divider 206N connects three series-connected resistors.

The input port 230 is configured to receive a feedback signal (VFB) that is indicative of the output voltage of power supply 101. For example, the feedback signal (VFB) indicates that the output voltage is approximately equal to the initial voltage at the beginning of the transition period. The feedback signal then flows over the respective voltage dividers 206A-206N, after which the outputs of the voltage dividers 206A-206N are sampled to obtain a first sampled signal (VFB1). Opening switch 205 stores the initial value of the first sampled signal in the capacitor of S&H circuit 212, while closing the switch 215 allows an error correction signal from the error amplifier 208 to regulate power supply 101.

The error correction signal has a magnitude that corresponds to a difference between the initial value of the first sampled signal ($V_{FB1}(n-1)$) and the present value of the second sampled signal ($V_{FB2}(n)$). The output voltage of power supply 101 may be reduced in accordance with the magnitude of the error correction signal. For example, the output voltage of power supply 101 may be reduced at a fixed rate so long as the magnitude of the error correction signal exceeds a threshold. As another example, the output voltage of power supply 101 may be reduced at a rate that is proportional to the magnitude of the error correction signal, in which case the rate of voltage regulation decreases as the output voltage of the power supply approaches the target voltage.

Accordingly, such a voltage regulation control loop 104 may allow a driver circuit 100 to more closely synchronize the delivery of power to plurality of LED chains 106 while dynamically enabling and disabling one or more of LED chains 106. In contrast to other systems that do not implement the techniques of the disclosure, such a driver circuit 100 may avoid inducing overcurrent plurality of LED chains 106, and prevent damage to or decreasing the operating life of plurality of LED chains 106.

Figure 3:
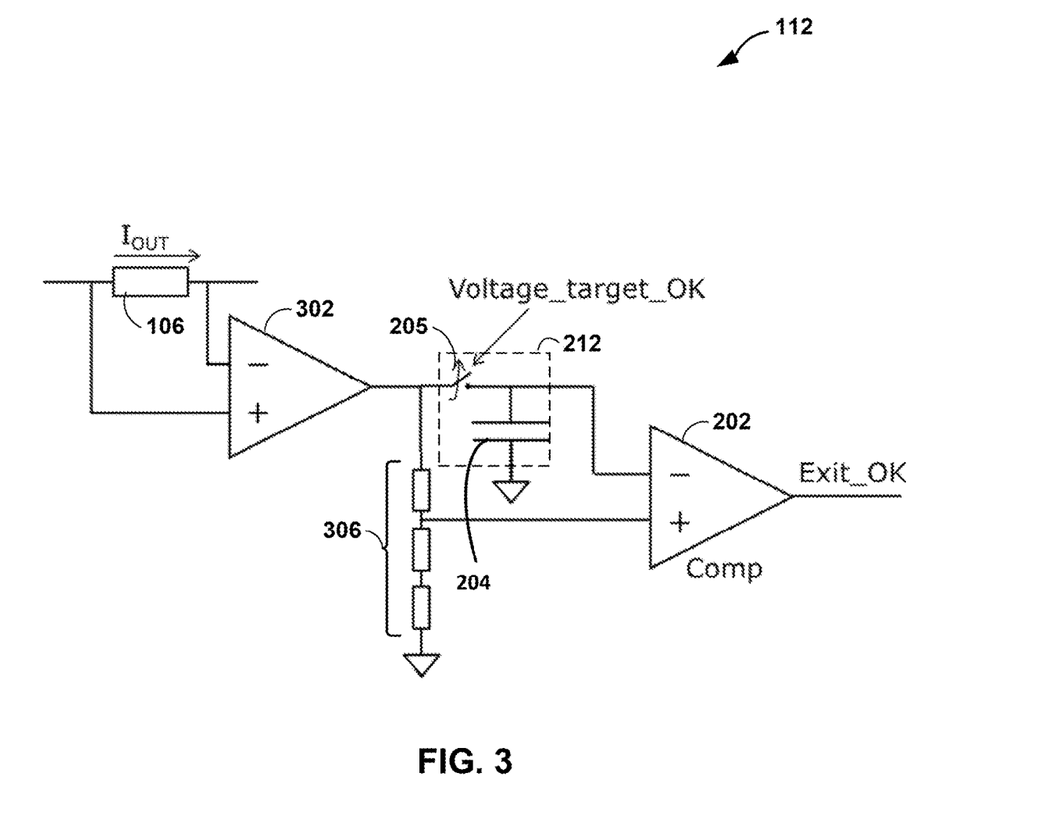
FIG. 3 is a block diagram illustrating an example changed load detector for the driver circuit of FIG. 1, in accordance with the techniques of the disclosure.

FIG. 3 is a block diagram illustrating an example changed load detector 112 for the driver circuit 100 of FIG. 1, in accordance with the techniques of the disclosure. The example changed load detector 112 operates to detect a changed load within plurality of LED chains 106 of FIG. 1 (e.g., when the number of selected LED chains of the plurality of LED chains 106 changes). The comparator 202 and S&H circuit 212 may function in a substantially similar fashion to the like elements of FIG. 2.

As depicted in FIG. 3, changed load detector 112 further includes a current sense amplifier 302. Current sense amplifier 302 senses the voltage drop on a shunt resistor 106 (that is proportional to LED current) and translates this in a voltage value referred to ground. In some examples, current sense amplifier 302 is a component of current regulation control loop 102 and functions to regulate the current flowing through plurality of LED chains 106.

S&H 212 receives, as an input, the output of current sense amplifier 302, and stores the value when the voltage target is reached. Comparator 202 receives, as a first input, the voltage of the capacitor 204 (e.g., the stored value of S&H 212). Comparator 202 uses the sampled voltage of capacitor 204 as an inverting input, and comparator 202 receives, as a non-inverting input, a partition of the voltage at the output of current sense amplifier 302. Thus, comparator 202 continuously monitors the output current of the plurality of LED chains 106 to determine whether the output current increases over the sampled value. In this fashion, comparator 202 may determine when microcontroller 108 activates one of the plurality of bypass switches 110 and adjusts the number of active LED chains of the plurality of LED chains 106. A ratio β of resistor dividers 306 sets the threshold of comparator 202. For example, when the output current of the plurality of LED chains 106 is higher than the sampled current by a factor 1/β, the output of comparator 202 becomes high. The output of comparator 202 may be used as to deactivate the voltage regulation control loop and activate the current regulation control loop again.

The changed load detector 112 of FIG. 3 is an example of the changed load detector 112 of FIG. 1. Therefore, driver circuit 100 may more closely synchronize the delivery of power to plurality of LED chains 106 while dynamically enabling and disabling one or more of LED chains 106. In contrast to other systems that do not implement the techniques of the disclosure, such a driver circuit 100 may avoid inducing overcurrent plurality of LED chains 106, and prevent damage to or decreasing the operating life of plurality of LED chains 106. Furthermore, the changed load detector 112 does not require microcontroller 108 to continuously poll the output current of the plurality of LED chains 106 to detect a change in the output current or in the number of active LED chains 106. Thus, such a driver circuit as described herein may implement automatic synchronization between activating a bypass switch to bypass the one or more LED chains and reactivating the current regulation control loop.

Figure 4A:
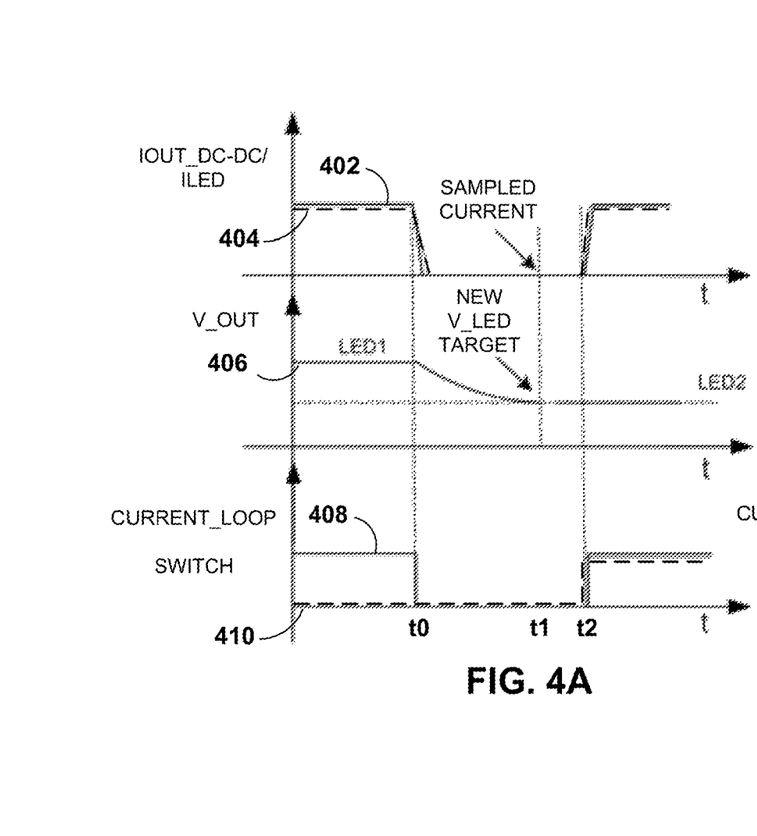
FIG. 4A is a chart illustrating example signals of the driver circuit of FIG. 1, in accordance with the techniques of the disclosure.

FIG. 4A is a chart illustrating example signals of the driver circuit 100 of FIG. 1, in accordance with the techniques of the disclosure. In the example of FIG. 4A, driver circuit 100 drives a first number of active LED chains of the plurality of LED chains 106. Subsequently, microcontroller 108 selectively activates a second number of LED chains of the plurality of LED chains 106. In this example, the second number of active LED chains has an operating voltage that is less than the threshold voltage ($V_{TH}$) of the first number of active LED chains. By using the techniques of the present disclosure, driver circuit 100 may prevent overcurrent induced in the second number of active LED chains, thus preventing damage or degradation in the second number of active LED chains.

As depicted in FIG. 4A, at time t0, microcontroller disconnects, via a switch, current regulation control loop 102 and connects voltage regulation control loop 104. The connection status of current regulation control loop 102 is depicted as line 408. At this time, the output current 402 of current regulation control loop 102 and the output current 404 flowing through the first number of LED chains of the plurality of LED chains 106 falls. Because voltage regulation control loop 104 is driving the forward voltage 406 of the first number of LED chains of the plurality of LED chains 106 to the lower target forward voltage for the second number of LED chains, the forward voltage 406 similarly falls.

At time t1, the forward voltage 406 falls to the target voltage. Upon the forward voltage 406 reaching the target voltage, S&H circuit 212 stores the output current 404 flowing through the first number of LED chains of the plurality of LED chains 106. Since the second number of active LED chains has an operating voltage that is less than the threshold voltage ($V_{TH}$) of the first number of active LED chains, at time t1, there is no residual current flowing through the LED chains.

At time t2, microcontroller 108 activates one or more bypass switches 110 to selectively activate the second number of LED chains of the plurality of LED chains 106. The switch from the first number of LED chains to the second number of LED chains one or more bypass switches 110 is depicted as line 410. After activating the second number of LED chains, changed load detector 112 waits until the output current flowing through the second number of LED chains is higher than the sampled current by a factor 1/β. Upon determining that the output current is higher than the sampled current, the driver circuit 100 automatically deactivates, via a switch, voltage regulation control loop 104 and reactivates current regulation control loop 102. The connection status of the current regulation control loop is depicted as line 408.

S&H circuit 212 of changed load detector 112 is included to ensure the detection of a change in the plurality of LED chains 106. For example, if a fixed threshold is used, if the threshold is too high, changed load detector 112 may not detect a small load change. Similarly, if the fixed threshold is too low, changed load detector 112 may reactivate the current regulation control loop 102 too soon, which may cause the plurality of LED chains 106 to suffer an overcurrent condition.

As seen in FIG. 4A, the driver circuit 100 of the present disclosure may regulate a constant voltage across the plurality of LED chains 106 while the number of active LEDs of plurality of LED chains 106 changes. Therefore, driver circuit 100 may more closely synchronize the delivery of power to plurality of LED chains 106 while dynamically enabling and disabling one or more of LED chains 106. In contrast to other systems that do not implement the techniques of the disclosure, such a driver circuit 100 may avoid inducing ripples, distortions, and overcurrent in the plurality of LED chains 106, and therefore prevent damage to or decreasing the operating life of the plurality of LED chains

106. Furthermore, the driver circuit 100 does not require microcontroller 108 to continuously poll the output current of the plurality of LED chains 106 to detect a change in the output current or in the number of active LED chains 106. Thus, such a driver circuit as described herein may use less power and provide greater precision than other driver circuits.

Figure 4B:
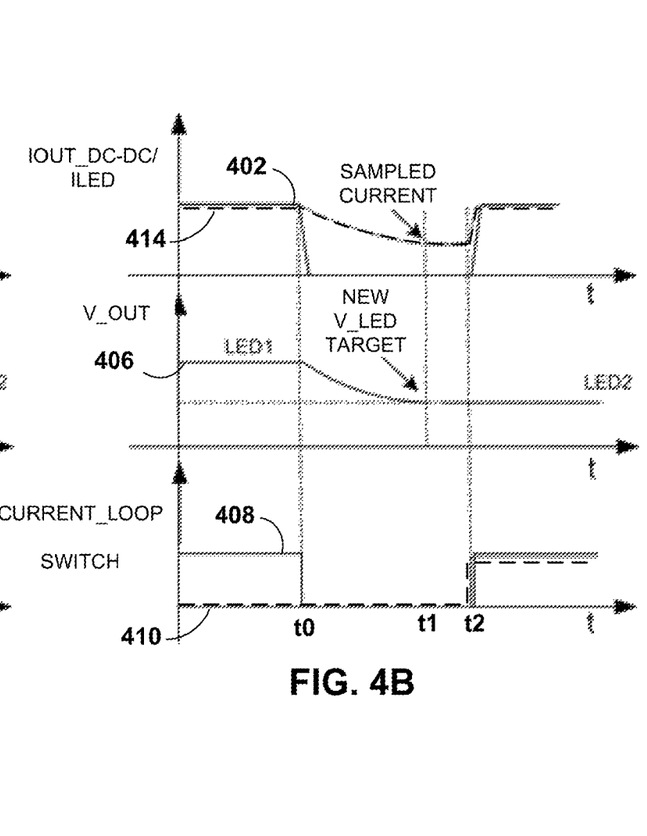
FIG. 4B is a chart illustrating example signals of the driver circuit of FIG. 1, in accordance with the techniques of the disclosure.

FIG. 4B is a chart illustrating example signals of the driver circuit 100 of FIG. 1, in accordance with the techniques of the disclosure. In the example of FIG. 4B, driver circuit 100 drives a first number of active LED chains of the plurality of LED chains 106. Subsequently, microcontroller 108 selectively activates a second number of LED chains of the plurality of LED chains 106. In this example, the second number of active LED chains has an operating voltage that is greater than the threshold voltage ($V_{TH}$) of the first number of active LED chains. By using the techniques of the present disclosure, driver circuit 100 may prevent overcurrent induced in the second number of active LED chains, thus preventing damage or degradation in the second number of active LED chains.

As depicted in FIG. 4B, at time t0, microcontroller disconnects, via a switch, current regulation control loop 102 and connects voltage regulation control loop 104. The connection status of current regulation control loop 102 is depicted as line 408. At this time, the output current 402 of current regulation control loop 102 and the output current 414 flowing through the first number of LED chains of the plurality of LED chains 106 falls (but does not reach zero). Because voltage regulation control loop 104 is driving the forward voltage 406 of the first number of LED chains of the plurality of LED chains 106 to the lower target forward voltage for the second number of LED chains, the forward voltage 406 similarly falls.

At time t1, the forward voltage 406 falls to the target voltage. Upon the forward voltage 406 reaching the target voltage, S&H circuit 112 stores the output current 414 flowing through the first number of LED chains of the plurality of LED chains 106. Since the second number of active LED chains has an operating voltage that is greater than the threshold voltage ($V_{TH}$) of the first number of active LED chains, at time t1 there is still residual current flowing on the LED chains.

At time t2, microcontroller 108 activates one or more bypass switches 110 to selectively activate the second number of LED chains of the plurality of LED chains 106. The switch from the first number of LED chains to the second number of LED chains one or more bypass switches 110 is depicted as line 410. After activating the second number of LED chains, changed load detector 112 waits until the output current flowing through the second number of LED chains is higher than the sampled current by a factor 1/β. Upon determining that the output current flowing through the second number of LED chains is higher than the sampled current, the driver circuit 100 automatically deactivates, via a switch, voltage regulation control loop 104 and reactivates current regulation control loop 102. The connection status of the current regulation control loop is depicted as line 408.

As seen in FIG. 4B, the driver circuit 100 of the present disclosure may regulate a constant voltage across the plurality of LED chains 106 while the number of active LEDs of plurality of LED chains 106 changes. Therefore, driver circuit 100 may more closely synchronize the delivery of power to plurality of LED chains 106 while dynamically enabling and disabling one or more of LED chains 106. In contrast to other systems that do not implement the techniques of the disclosure, such a driver circuit 100 may avoid inducing ripples, distortions, and overcurrent in the plurality of LED chains 106, and therefore prevent damage to or decreasing the operating life of the plurality of LED chains 106. Furthermore, the driver circuit 100 does not require microcontroller 108 to continuously poll the output current of the plurality of LED chains 106 to detect a change in the output current or in the number of active LED chains 106. Thus, such a driver circuit as described herein may use less power and provide greater precision than other driver circuits.

Figure 5:
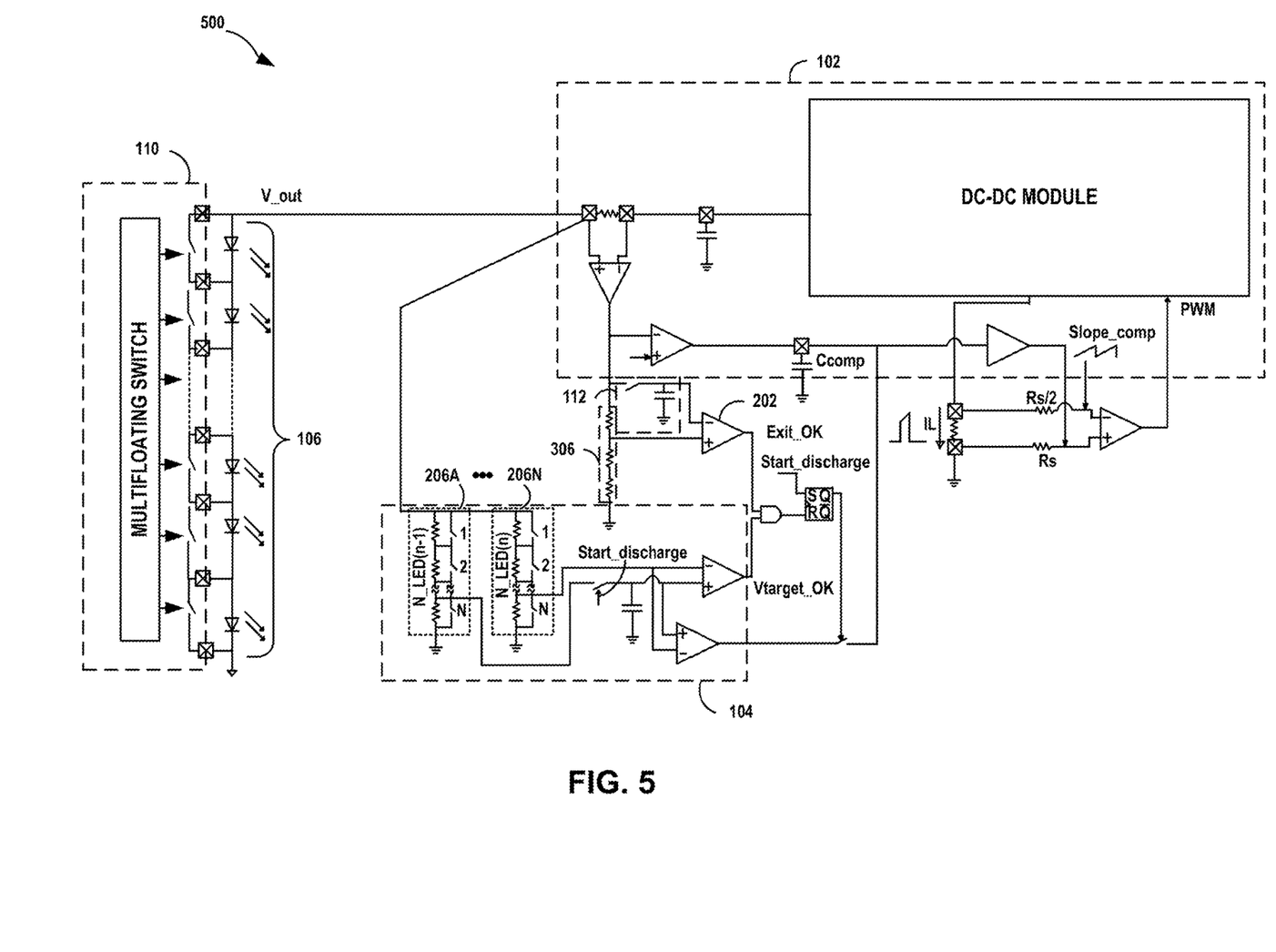
FIG. 5 is a circuit diagram illustrating an example driver circuit for a plurality of LED chains in accordance with the techniques of the disclosure.

FIG. 5 is a circuit diagram illustrating an example driver circuit 500 for a plurality of LED chains in accordance with the techniques of the disclosure. In general, driver circuit 500 of FIG. 5 functions in a substantially similar fashion to that of driver circuit 100 of FIG. 1, but is illustrated in further detail. For example, driver circuit 500 of FIG. 5 includes a current regulation control loop 102 for regulating a current flowing through a plurality of LED chains 106, and a voltage regulation control loop 104 for regulating a voltage across the plurality of LED chains 106. Driver circuit 500 further includes a plurality of bypass switches 110 for selectively bypassing one or more LED chains of the plurality of LED chains 106. Driver circuit 500 includes an S&H circuit 112 that functions to sample an output current of the plurality of LED chains 106 for comparison to a current of the changed LED chain by comparator 202.

In an operation to bypass one or more LED chains of plurality of LED chains 106, driver circuit 500 deactivates current regulation control loop 102 and activates voltage regulation control loop 104. Driver circuit 500 waits until the forward voltage across the plurality of LED chains 106 falls to a desired voltage value (e.g., the target operating voltage for a set of active LED chains of plurality of LED chains 106 that subsequently are to be enabled). Upon reaching the desired voltage value, driver circuit 500 activates the S&H circuit which stores the output current flowing through the plurality of LED chains 106. Further, driver circuit 500 activates at least one bypass switch of plurality of bypass switches 110 to bypass the one or more LED chains of plurality of LED chains 106.

A comparator 202 compares the output of S&H circuit 112 to a partition of the voltage at the output of a current sense amplifier. The partition is established by a ratio of resistor dividers 306. Upon detecting that the current flowing through the remaining one or more LED chains of plurality of LED chains 106 is higher than the current stored by changed load detector 112 by a factor 1/β, comparator 202 generates an output indicating such. In response to the output of comparator 202, driver circuit 500 deactivates voltage regulation control loop 104 and reactivates current regulation control loop 102.

Accordingly, the driver circuit 500 of FIG. 5 may regulate a constant voltage across the plurality of LED chains 106 while the number of active LEDs of plurality of LED chains 106 changes. Therefore, driver circuit 500 may more closely synchronize the delivery of power to plurality of LED chains 106 while dynamically enabling and disabling one or more of LED chains 106. In contrast to other systems that do not implement the techniques of the disclosure, such a driver circuit 500 may avoid inducing overcurrent plurality of LED chains 106, and prevent damage to or decreasing the operating life of plurality of LED chains 106. Furthermore, the driver circuit 500 of FIG. 5 does not require a microcontroller to continuously poll the output current of the plurality of LED chains 106 to detect a change in the output current or in the number of active LED chains 106. Thus, such a driver circuit as described herein may be cheaper, use less power, and provide greater precision than other driver circuits.

Figure 6:
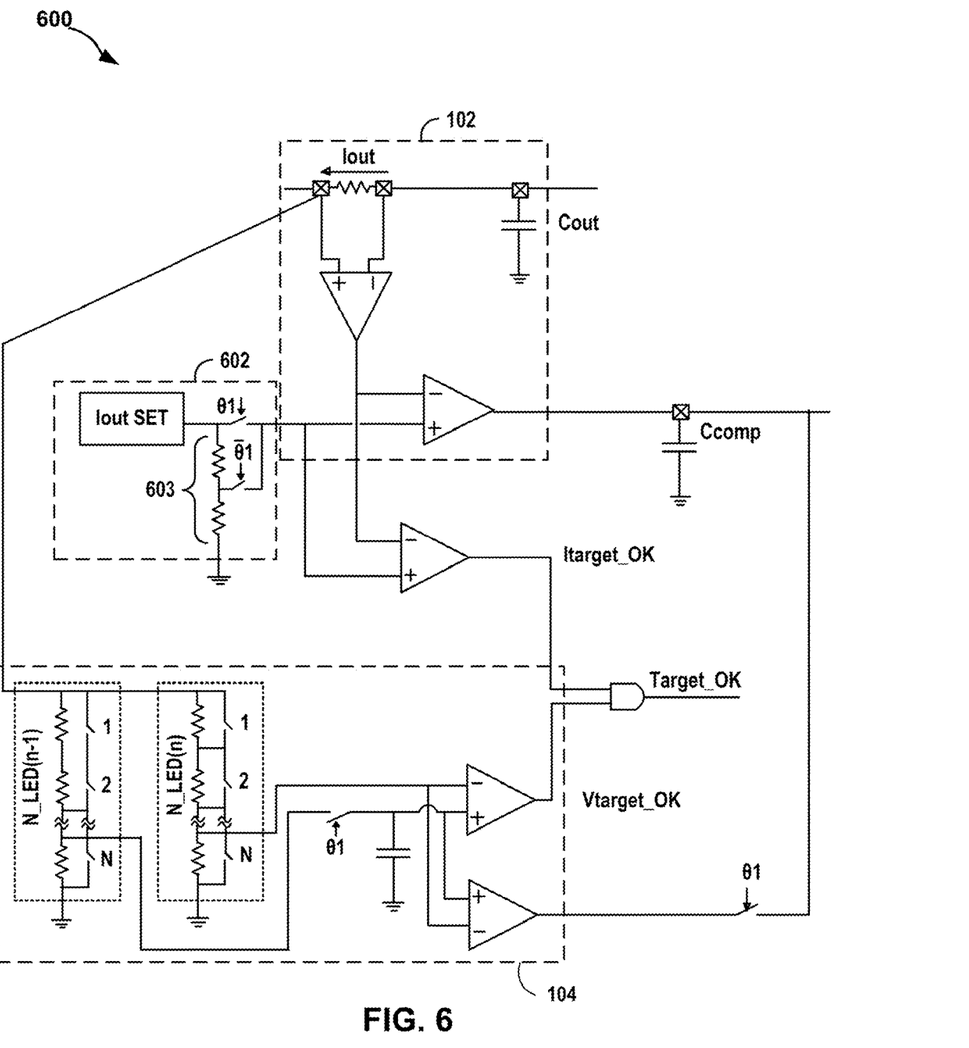
FIG. 6 is a circuit diagram illustrating an example control loop for the driver circuit of FIG. 5, in accordance with the techniques of the disclosure.

FIG. 6 is a circuit diagram illustrating an example control loop 600 for the driver circuit of FIG. 5, in accordance with the techniques of the disclosure. In general, the current regulation control loop 102 and the voltage regulation control loop 104 of control loop 600 function in a substantially similar fashion to the like elements of FIG. 5. However, control loop 600 further includes additional circuitry to provide additional robustness to driver circuit 500 to correctly detect a change in plurality of LED chains 106, even when the sampled current would be too high for changed load detector 112 of FIG. 3 to function correctly. In the example control loop 600 of FIG. 6, current regulation control loop 102 further includes a reference changer 602. Reference changer 602 may dynamically adjust the ratio of reference resistors 603 so that the current regulation control loop 102 may still function, but at a lower reference point. For example, in response to a microcontroller trigger, control loop 600 selects a lower reference via resistors 603 for the current regulation control loop 102 and enables a voltage regulation control loop 104 such that the driver circuit 500 selects the minimum of two regulation loops (e.g., one of current regulation control loop 102 and voltage regulation control loop 104). Thus, output current is always lower or equal to the lowered reference before driver circuit 500 activates S&H circuit 212, which stores the output current flowing through the plurality of LED chains 106. Upon switching the selected number of the plurality of LED chains 106, driver circuit 500 restores the reference changer circuit 602 to its original setting, restoring function to current regulation control loop 102.

As one example of the above, in response to a microcontroller trigger, control loop 600 dynamically adjusts, via reference changer 602, a ratio of reference resistors 603 such that current regulation control loop 102 operates at a lower reference point. Further, control loop 600 senses a first output current of current regulation control loop 102 and a second output current of voltage regulation control loop 104. Driver circuit 500 determines a minimum of the first output current and the second output current, e.g., determines the lesser of the first output current of current regulation control loop 102 and the second output current of voltage regulation control loop 104. Based on the determination of the lesser of the first output current of current regulation control loop 102 and the second output current of voltage regulation control loop 104, driver circuit 500 selects one of current regulation control loop 102 and voltage regulation control loop 104 to regulate the forward voltage of the plurality of LED chains 106. For example, if the first output current of current regulation control loop 102 is less than the second output current of voltage regulation control loop 104, driver circuit 500 regulates the forward voltage of the plurality of LED chains 106 via current regulation control loop 102. In contrast, if the first output current of current regulation control loop 102 is greater than the second output current of voltage regulation control loop 104, driver circuit 500 regulates the forward voltage of the plurality of LED chains 106 via voltage regulation control loop 104.

Accordingly, the control loop 600 of FIG. 6 may allow driver circuit 500 to select one of a current regulation control loop 102 and a voltage regulation control loop 104 when switching the selected number of the plurality of LED chains 106 such that the plurality of LED chains do not suffer overcurrent. Such a control loop may allow driver circuit 500 to correctly detect a change in the output current of plurality of LED chains 106, even when the magnitude of the sampled output current would otherwise be too high for changed load detector 112 to function correctly. Therefore, driver circuit 500 may more closely synchronize the delivery of power to plurality of LED chains 106 while dynamically enabling and disabling one or more of LED chains 106. In contrast to other systems that do not implement the techniques of the disclosure, such a driver circuit 500 may avoid inducing overcurrent plurality of LED chains 106, and prevent damage to or decreasing the operating life of plurality of LED chains 106. Furthermore, the control loop 500 does not require a microcontroller to continuously poll the output current of the plurality of LED chains 106 to detect a change in the output current or in the number of active LED chains 106. Thus, such a driver circuit as described herein may use less power, be cheaper, and provide greater precision than other driver circuits.

Figure 7:
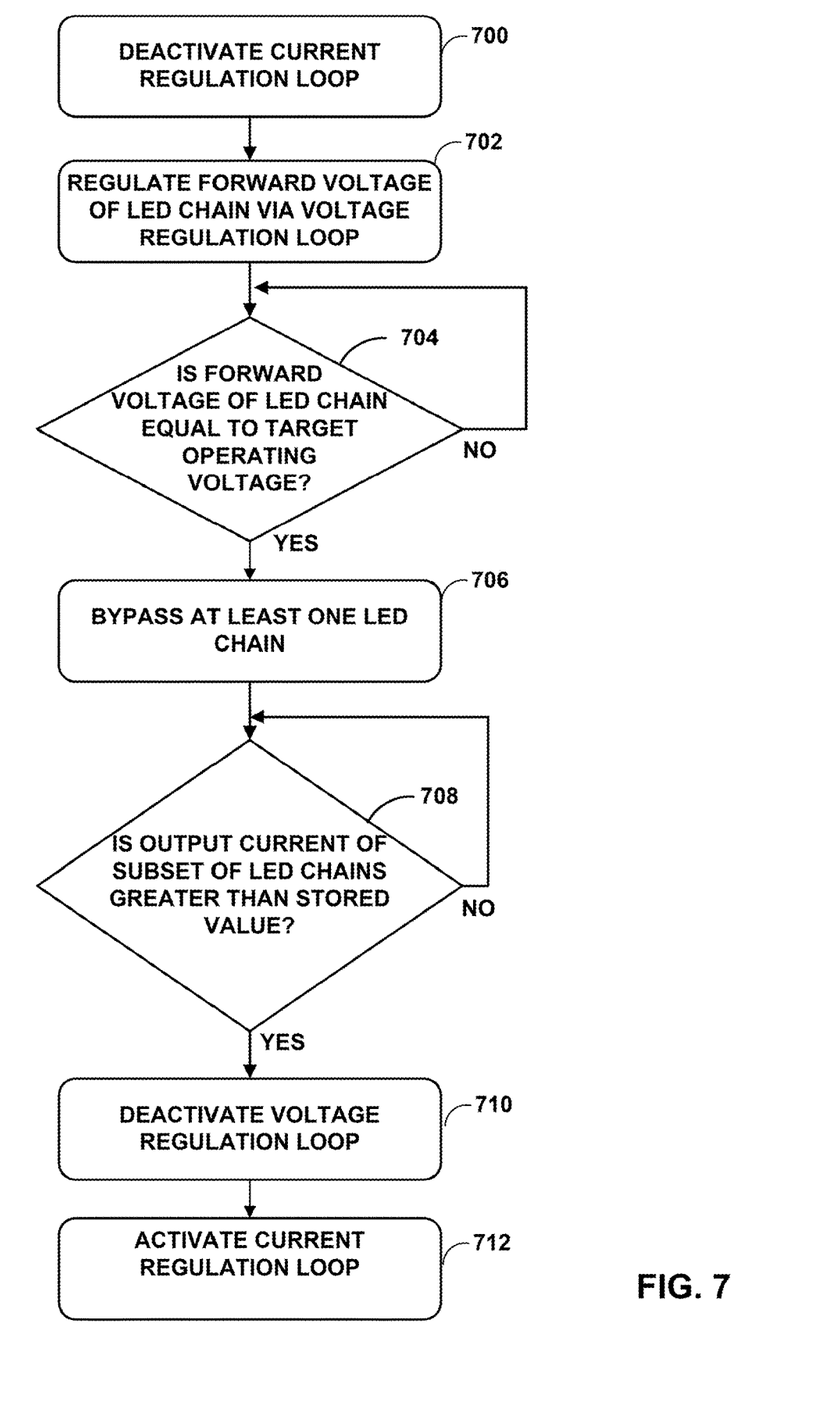
FIG. 7 is a flowchart illustrating an example operation of the driver circuit for the plurality of LED chains of FIG. 1, in accordance with the techniques of the disclosure.

FIG. 7 is a flowchart illustrating an example operation of the driver circuit for the plurality of LED chains of FIG. 1, in accordance with the techniques of the disclosure. For convenience, FIG. 7 is described with respect to FIG. 1.

In the example of FIG. 7, driver circuit 100 drives a first number of active LED chains of the plurality of LED chains 106. In an operation to activate a second number of LED chains of the plurality of LED chains 106 (e.g., to bypass one or more LED chains of plurality of LED chains 106), microcontroller 108 disconnects the current regulation control loop 102 (700). Further, microcontroller 108 activates voltage regulation control loop 104 to regulate the forward voltage across the first number of LED chains of the plurality of LED chains 106 to the target operating voltage of the second number of LED chains (702).

Voltage regulation control loop 104 determines whether the forward voltage across the plurality of LED chains 106 is equal to a target operating voltage for the second number of LED chains of the plurality of LED chains 106 to be activated (704). If the forward voltage across the plurality of LED chains 106 has not fallen to the target operating voltage (e.g., "NO" block of 704), voltage regulation control loop 104 continues to wait. If the forward voltage across the plurality of LED chains 106 has reached the target operating voltage (e.g., "YES" block of 704), voltage regulation control loop 104 activates changed load detector 112 to store the output current flowing through the first number of LED chains. Further, microcontroller 108 activates at least one bypass switch of plurality of bypass switches 110 to bypass one or more LED chains of the plurality of LED chains 106 (706).

Changed load detector 112 monitors the output current of the remaining one or more LED chains of the plurality of LED chains 106 to determine when the output current is higher than the stored value of the changed load detector 112 (708). If this output current flowing through the plurality of LED chains 106 has not risen to the target output current (e.g., "NO" block of 708), changed load detector 112 continues to wait. Upon determining that the output current for the remaining one or more LED chains of plurality of LED chains 106 is higher than the stored value of the changed load detector 112 by a factor $1/\beta$ (e.g., "YES" block of 708), changed load detector 112 deactivates voltage regulation control loop 104 (710) and reactivates current regulation control loop 102 (712).

Accordingly, the driver circuit 100 as described herein may regulate a constant voltage across the plurality of LED chains 106 prior to changing the number of active LEDs of plurality of LED chains 106. Therefore, driver circuit 100 may more closely synchronize the delivery of power to plurality of LED chains 106 while dynamically enabling and disabling one or more of LED chains 106. In contrast to other systems that do not implement the techniques of the disclosure, such a driver circuit 100 may avoid inducing overcurrent plurality of LED chains 106, and prevent damage to or decreasing the operating life of plurality of LED chains 106. Furthermore, the changed load detector 112 does not require microcontroller 108 to continuously poll the output current of the plurality of LED chains 106 to detect a change in the output current or in the number of active LED chains 106. Thus, such a driver circuit as described herein may use less power and provide greater precision than other driver circuits.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

The following examples may illustrate one or more aspects of the disclosure.

Example 1

A method comprising: deactivating a current regulation control loop, wherein the current regulation control loop is connected to a plurality of light-emitting diode (LED) chains in series; regulating, via a voltage regulation control loop connected to the plurality of LED chains, a forward voltage of the plurality of LED chains; upon determining that a forward voltage of the plurality of LED chains is equal to a target operating voltage for a subset of the plurality of LED chains, bypassing at least one of the plurality of LED chains such that only the subset of the plurality of LED chains is connected to the current regulation control loop and the voltage regulation control loop; and upon determining that an output current of the subset of the plurality of LED chains is equal to a target operating current for the subset of the plurality of LED chains: deactivating the voltage regulation control loop; and activating the current regulation control loop.

Example 2

The method of example 1, wherein determining that the output current of the subset of the plurality of LED chains is equal to the target operating current comprises: sensing, via a microcontroller, the output current of the subset of the plurality of LED chains; and determining, via the microcontroller, that the output current is equal to the target operating current.

Example 3

The method of example 1, wherein determining that the output current of the subset of the plurality of LED chains is equal to the target operating current comprises: sensing, via a changed load detector circuit, an output current of the plurality of LED chains; storing, via a sample and hold circuit of the changed load detector circuit, a value of the sensed output current of the plurality of LED chains; and comparing, via a comparator of the changed load detector circuit, the stored value to an output current of the subset of the plurality of LED chains.

Example 4

The method of any of examples 1-3, wherein regulating the forward voltage of the plurality of LED chains comprises: dynamically adjusting a ratio of reference resistors such that the current regulation control loop operates at a lower reference point; sensing a first output current of the current regulation control loop; sensing a second output current of the voltage regulation control loop; determining a minimum of the first output current and the second output current; and regulating the forward voltage of the plurality of LED chains via one of the current regulation control loop and the voltage regulation control loop based on the determined minimum of the first output current and the second output current.

Example 5

The method of any of examples 1-4, wherein one of a DC-DC current regulator or a linear current regulator comprises the current regulation control loop.

Example 6

The method of any of examples 1-5, wherein the plurality of LED chains provides a plurality of different functions for a vehicle illumination system.

Example 7

The method of example 6, wherein: a first LED chain of the plurality of LED chains provides high-beam headlight functionality for the vehicle illumination system; a second LED chain of the plurality of LED chains provides low-beam headlight functionality for the vehicle illumination system; a third LED chain of the plurality of LED chains provides corner light functionality for the vehicle illumination system; a fourth LED vehicle illumination system of the plurality of LED chains provides daytime running light functionality for the vehicle; and a fifth LED chain of the plurality of LED chains provides positioning light functionality for the vehicle illumination system.

Example 8

A driver circuit for a plurality of light-emitting diode (LED) chains, configured to: deactivate a current regulation control loop, wherein the current regulation control loop is connected to a plurality of light-emitting diode (LED) chains; regulate, via a voltage regulation control loop connected to the plurality of LED chains, a forward voltage of the plurality of LED chains; upon determining that a forward voltage of the plurality of LED chains is equal to a target operating voltage for a subset of the plurality of LED chains, bypass at least one of the plurality of LED chains such that only the subset of the plurality of LED chains is connected to the current regulation control loop and the voltage regulation control loop; and upon determining that an output current of the subset of the plurality of LED chains is equal to a target operating current for the subset of the plurality of LED chains: deactivate the voltage regulation control loop; and activate the current regulation control loop.

Example 9

The driver circuit of example 8, wherein the driver circuit comprises a microcontroller configured to: sense the output current of the subset of the plurality of LED chains; and determine that the output current is equal to the target operating current.

Example 10

The driver circuit of example 8, wherein the driver circuit further comprises: a changed load detector circuit configured to sense an output current of the plurality of LED chains; a sample and hold circuit of the changed load detector circuit configured to store a value of the sensed output current of the plurality of LED chains; and a comparator of the changed load detector circuit configured to compare the stored value to an output current of the subset of the plurality of LED chains.

Example 11

The driver circuit of any of examples 8-10, wherein the driver circuit is further configured to: dynamically adjust a ratio of reference resistors such that the current regulation control loop operates at a lower reference point; sense a first output current of the current regulation control loop; sense a second output current of the voltage regulation control loop; determine a minimum of the first output current and the second output current; and regulate the forward voltage of the plurality of LED chains via one of the current regulation control loop and the voltage regulation control loop based on the determined minimum of the first output current and the second output current.

Example 12

The driver circuit of any of examples 8-11, wherein one of a DC-DC current regulator or a linear current regulator comprises the current regulation control loop.

Example 13

The driver circuit of any of examples 8-12, wherein the plurality of LED chains provides a plurality of different functions for a vehicle illumination system.

Example 14

A system comprising: a driver circuit, configured to: deactivate a current regulation control loop, wherein the current regulation control loop is connected to a plurality of light-emitting diode (LED) chains; regulate, via a voltage regulation control loop connected to the plurality of LED chains, a forward voltage of the plurality of LED chains; upon determining that a forward voltage of the plurality of LED chains is equal to a target operating voltage for a subset of the plurality of LED chains, bypass at least one of the plurality of LED chains such that only the subset of the plurality of LED chains is connected to the current regulation control loop and the voltage regulation control loop; and upon determining that an output current of the subset of the plurality of LED chains is equal to a target operating current for the subset of the plurality of LED chains: deactivate the voltage regulation control loop; and activate the current regulation control loop; and the plurality of LED chains.

Example 15

The system of example 14, wherein the driver circuit comprises a microcontroller configured to: sense the output current of the subset of the plurality of LED chains; and determine that the output current is equal to the target operating current.

Example 16

The system of example 14, wherein the driver circuit further comprises: a changed load detector circuit configured to sense an output current of the plurality of LED chains; a sample and hold circuit of the changed load detector circuit configured to store a value of the sensed output current of the plurality of LED chains; and a comparator of the changed load detector circuit configured to compare the stored value to an output current of the subset of the plurality of LED chains.

Example 17

The system of examples 14-16, wherein the driver circuit is further configured to: dynamically adjust a ratio of reference resistors such that the current regulation control loop operates at a lower reference point; sense a first output current of the current regulation control loop; sense a second output current of the voltage regulation control loop; determine a minimum of the first output current and the second output current; and regulate the forward voltage of the plurality of LED chains via one of the current regulation control loop and the voltage regulation control loop based on the determined minimum of the first output current and the second output current.

Example 18

The system of any of examples 14-17, wherein one of a DC-DC current regulator or a linear current regulator comprises the current regulation control loop.

Example 19

The system of any of examples 14-18, wherein the plurality of LED chains provides a plurality of different functions for a vehicle illumination system.

Example 20

The driver circuit of example 19, wherein: a first LED chain of the plurality of LED chains provides high-beam headlight functionality for the vehicle illumination system; a second LED chain of the plurality of LED chains provides low-beam headlight functionality for the vehicle illumination system; a third LED chain of the plurality of LED chains provides corner light functionality for the vehicle illumination system; a fourth LED vehicle illumination system of the plurality of LED chains provides daytime running light functionality for the vehicle; and a fifth LED chain of the plurality of LED chains provides positioning light functionality for the vehicle illumination system.

Various examples have been described. These and other examples are within the scope of the following claims.

What is claimed is:

1. A method for preventing overcurrent when bypassing at least one LED chain of a plurality of light-emitting diode (LED) chains connected in series comprising:
   deactivating a current regulation control loop, wherein the current regulation control loop is connected to the plurality of LED chains in series;
   regulating, via a voltage regulation control loop connected to the plurality of LED chains, a forward voltage of the plurality of LED chains;
   upon determining that the forward voltage of the plurality of LED chains is equal to a target operating voltage for a subset of the plurality of LED chains, bypassing the at least one of the plurality of LED chains such that only the subset of the plurality of LED chains is connected to the current regulation control loop and the voltage regulation control loop; and
   upon determining that an output current of the subset of the plurality of LED chains is equal to a target operating current for the subset of the plurality of LED chains:
      deactivating the voltage regulation control loop; and
      activating the current regulation control loop.

2. The method of claim 1, wherein determining that the output current of the subset of the plurality of LED chains is equal to the target operating current comprises:
   sensing, via a microcontroller, the output current of the subset of the plurality of LED chains; and
   determining, via the microcontroller, that the output current is equal to the target operating current.

3. The method of claim 1, wherein determining that the output current of the subset of the plurality of LED chains is equal to the target operating current comprises:
   sensing, via a changed load detector circuit, an output current of the plurality of LED chains;
   storing, via a sample and hold circuit of the changed load detector circuit, a value of the sensed output current of the plurality of LED chains; and
   comparing, via a comparator of the changed load detector circuit, the stored value to an output current of the subset of the plurality of LED chains.

4. The method of claim 1, wherein regulating the forward voltage of the plurality of LED chains comprises:
   dynamically adjusting a ratio of reference resistors such that the current regulation control loop operates at a lower reference point;
   sensing a first output current of the current regulation control loop;
   sensing a second output current of the voltage regulation control loop;
   determining a minimum of the first output current and the second output current; and
   regulating the forward voltage of the plurality of LED chains via one of the current regulation control loop and the voltage regulation control loop based on the determined minimum of the first output current and the second output current.

5. The method of claim 1, wherein one of a DC-DC current regulator or a linear current regulator comprises the current regulation control loop.

6. The method of claim 1, wherein the plurality of LED chains provides a plurality of different functions for a vehicle illumination system.

7. The method of claim 6, wherein:
   a first LED chain of the plurality of LED chains provides high-beam headlight functionality for the vehicle illumination system;
   a second LED chain of the plurality of LED chains provides low-beam headlight functionality for the vehicle illumination system;
   a third LED chain of the plurality of LED chains provides corner light functionality for the vehicle illumination system;
   a fourth LED vehicle illumination system of the plurality of LED chains provides daytime running light functionality for the vehicle; and
   a fifth LED chain of the plurality of LED chains provides positioning light functionality for the vehicle illumination system.

8. A driver circuit for preventing overcurrent when bypassing at least one LED chain of a plurality of light-emitting diode (LED) chains, configured to:
   deactivate a current regulation control loop, wherein the current regulation control loop is connected to a plurality of light-emitting diode (LED) chains;
   regulate, via a voltage regulation control loop connected to the plurality of LED chains, a forward voltage of the plurality of LED chains;
   upon determining that the forward voltage of the plurality of LED chains is equal to a target operating voltage for a subset of the plurality of LED chains, bypass the at least one LED chain of the plurality of LED chains such that only the subset of the plurality of LED chains is connected to the current regulation control loop and the voltage regulation control loop; and
   upon determining that an output current of the subset of the plurality of LED chains is equal to a target operating current for the subset of the plurality of LED chains:
      deactivate the voltage regulation control loop; and
      activate the current regulation control loop.

9. The driver circuit of claim 8, wherein the driver circuit comprises a microcontroller configured to:
   sense the output current of the subset of the plurality of LED chains; and determine that the output current is equal to the target operating current.

10. The driver circuit of claim 8, wherein the driver circuit further comprises:
a changed load detector circuit configured to sense an output current of the plurality of LED chains;
a sample and hold circuit of the changed load detector circuit configured to store a value of the sensed output current of the plurality of LED chains; and
a comparator of the changed load detector circuit configured to compare the stored value to an output current of the subset of the plurality of LED chains.

11. The driver circuit of claim 8, wherein the driver circuit is further configured to:
dynamically adjust a ratio of reference resistors such that the current regulation control loop operates at a lower reference point;
sense a first output current of the current regulation control loop;
sense a second output current of the voltage regulation control loop;
determine a minimum of the first output current and the second output current; and
regulate the forward voltage of the plurality of LED chains via one of the current regulation control loop and the voltage regulation control loop based on the determined minimum of the first output current and the second output current.

12. The driver circuit of claim 8, wherein one of a DC-DC current regulator or a linear current regulator comprises the current regulation control loop.

13. The driver circuit of claim 8, wherein the plurality of LED chains provides a plurality of different functions for a vehicle illumination system.

14. A system for preventing overcurrent when bypassing at least one LED chain of a plurality of light-emitting diode (LED) chains connected in series comprising:
a driver circuit, configured to:
deactivate a current regulation control loop, wherein the current regulation control loop is connected to the plurality of LED chains;
regulate, via a voltage regulation control loop connected to the plurality of LED chains, a forward voltage of the plurality of LED chains;
upon determining that the forward voltage of the plurality of LED chains is equal to a target operating voltage for a subset of the plurality of LED chains, bypass the at least one LED chain of the plurality of LED chains such that only the subset of the plurality of LED chains is connected to the current regulation control loop and the voltage regulation control loop; and
upon determining that an output current of the subset of the plurality of LED chains is equal to a target operating current for the subset of the plurality of LED chains:
deactivate the voltage regulation control loop; and
activate the current regulation control loop; and
the plurality of LED chains.

15. The system of claim 14, wherein the driver circuit comprises a microcontroller configured to:
sense the output current of the subset of the plurality of LED chains; and
determine that the output current is equal to the target operating current.

16. The system of claim 14, wherein the driver circuit further comprises:
a changed load detector circuit configured to sense an output current of the plurality of LED chains;
a sample and hold circuit of the changed load detector circuit configured to store a value of the sensed output current of the plurality of LED chains; and
a comparator of the changed load detector circuit configured to compare the stored value to an output current of the subset of the plurality of LED chains.

17. The system of claim 14, wherein the driver circuit is further configured to:
dynamically adjust a ratio of reference resistors such that the current regulation control loop operates at a lower reference point;
sense a first output current of the current regulation control loop;
sense a second output current of the voltage regulation control loop;
determine a minimum of the first output current and the second output current; and
regulate the forward voltage of the plurality of LED chains via one of the current regulation control loop and the voltage regulation control loop based on the determined minimum of the first output current and the second output current.

18. The system of claim 14, wherein one of a DC-DC current regulator or a linear current regulator comprises the current regulation control loop.

19. The system of claim 14, wherein the plurality of LED chains provides a plurality of different functions for a vehicle illumination system.

20. The driver circuit of claim 19, wherein:
a first LED chain of the plurality of LED chains provides high-beam headlight functionality for the vehicle illumination system;
a second LED chain of the plurality of LED chains provides low-beam headlight functionality for the vehicle illumination system;
a third LED chain of the plurality of LED chains provides corner light functionality for the vehicle illumination system;
a fourth LED vehicle illumination system of the plurality of LED chains provides daytime running light functionality for the vehicle; and
a fifth LED chain of the plurality of LED chains provides positioning light functionality for the vehicle illumination system.

* * * * *